United States Patent [19]

Woolley

[11] 4,185,979
[45] Jan. 29, 1980

[54] APPARATUS AND METHOD FOR TRANSFERRING HEAT TO AND FROM A BED OF METAL HYDRIDES

[75] Inventor: Ronald L. Woolley, Orem, Utah

[73] Assignee: Billings Energy Corporation, Salt Lake City, Utah

[21] Appl. No.: 873,867

[22] Filed: Jan. 31, 1978

[51] Int. Cl.² .............................................. F17C 7/02
[52] U.S. Cl. ........................................... 62/48; 34/15; 48/199 FM
[58] Field of Search ................... 62/45, 48, 50, 51, 55, 62/514 R; 123/1 A, DIG. 12; 34/15; 48/199 FM

[56] References Cited

U.S. PATENT DOCUMENTS

| | | | |
|---|---|---|---|
| 3,392,537 | 7/1968 | Woerner | 62/52 |
| 3,516,263 | 6/1970 | Wiswall, Jr. et al. | 62/48 |
| 3,732,690 | 5/1973 | Meijer | 123/1 A |

Primary Examiner—Ronald C. Capossela
Attorney, Agent, or Firm—Calvin E. Thorpe

[57] ABSTRACT

A method and apparatus are disclosed for transferring heat to or from metal hydrides contained in storage containers as hydrogen gas is being charged to or withdrawn from the storage containers, wherein the hydrogen gas being charged to or withdrawn from the storage containers functions as a convective energy carrier. A plurality of the containers are connected together in flow communication in series, so that when a pressure differential is established across the series of containers, hydrogen gas associated with the metal hydride will flow from one container to the next container in the direction of the lower pressure. A pressure differential is created across the series of containers by charging hydrogen to either the first or last container in the series, or by withdrawing hydrogen from either the first or last container in a series of containers that has been previously charged with hydrogen. Hydrogen gas flowing through the conduits connecting adjacent containers is heated or cooled in heat exchanger means associated with the conduits. The pressure differential across the series of containers can be periodically reversed by periodically alternating charging hydrogen to the first and last containers of the series during the charging of said containers, and by periodically alternating the discharge of hydrogen from the first and last containers of the series when hydrogen is being withdrawn from the series of containers.

13 Claims, 3 Drawing Figures

APPARATUS AND METHOD FOR TRANSFERRING HEAT TO AND FROM A BED OF METAL HYDRIDES

BACKGROUND OF THE INVENTION

1. Field

This invention pertains to the storage of hydrogen in the form of solid metal hydrides contained in appropriate containers, e.g., pressure vessels. In particular, the invention relates to methods and apparatus for transferring heat to and from the metal hydrides contained in the storage containers.

2. State of the Art

One factor that has limited the use of hydrogen, especially as a fuel, is the difficulty of efficiently and safely storing it. Storage as a liquid is costly due to the energy expended in liquifying the hydrogen, and the extremely low temperature of the liquid hydrogen presents numerous safety problems. Storing hydrogen as a gas requires extremely heavy and bulky containers and is impractical for many contemplated uses of hydrogen.

An attractive alternative to the conventional storage methods has been recently proposed in which hydrogen is stored in the form of a metallic hydride. Many metals and alloys will reversibly react with hydrogen to form metallic hydrides which contain more hydrogen per unit volume than liquid hydrogen. Heat is liberated when the hydrogen and metallic material reacts to form the hydrides and must be removed to allow the hydriding reactions to proceed to completion. Conversely, heat is absorbed during the decomposition of the hydride to release hydrogen, and the hydrides are preferably heated during their decomposition to provide an adequate rate of liberation of hydrogen therefrom.

Heating and cooling of the metallic hydride material has been accomplished by conventional techniques including heating or cooling the container in which the material is held, or spacing tubes throughout the bed of hydride material and circulating a heat exchange medium in the tubes. In such techniques, the amount of heat transferred to the metallic hydride depends on the area of the container or the surface area of the tubes extending through the bed, as well as on the conductive heat transfer characteristics of the metallic hydride. It has also been suggested to use hydrogen gas itself as a convective energy carrier, and, thus, overcome the limitations of the above-mentioned techniques. In addition, the direct cooling and heating of the hydrides permits rapid cycling between charge and discharge operations, and, thus, increase the efficiency of a given system. As proposed in paper number 760569 presented at the SAE Fuels and Lubricants Meeting in St. Louis, Mo., June 7-10, 1976, by Hoffman et al. of Brookhaven National Laboratory, hydrogen would be circulated through the metallic hydride in the containers to carry heat directly to where it is needed. Heat exchange would take place with the hydrogen in an external heat exchanger to supply the heat to the hydrogen. Large compressors would be required to circulate the hydrogen. Such compressors are high capital cost items and are expensive to operate due to high maintenance and energy requirements.

OBJECTIVES

The primary objective of the present invention was to provide a method and system utilizing the efficient heat exchange and rapid cycling possible when hydrogen, being charged to or withdrawn from the system, is used as a convective energy carrier. Another object was to provide a system in which any supplemental heat requirements could be met by a relatively small recirculation of hydrogen through the bed of metallic hydrides as compared to the large recirculation necessary in systems suggested in the prior art.

SUMMARY OF THE INVENTION

The above objectives are achieved, in accordance with the present invention, using a particular method and apparatus for transferring heat to and from metal hydrides contained in a plurality of storage containers, wherein hydrogen, which is either being charged to or withdrawn from the storage containers, acts as a convective heat transfer agent. The storage containers are connected together in series by fluid flow conduits, so that when a pressure differential is applied across the series of containers, fluid will flow from one container to the next container in the direction of the lower pressure. The containers are filled with a metal or metal alloy which is capable of reacting with and thereby absorbing hydrogen gas at a given temperature and pressure.

When charging a series of containers with hydrogen, a pressure differential is established across the series of containers by connecting a source of relatively high pressure hydrogen to either the first or last container in the series thereof. Heat exchanger means are provided in conjunction with each of the conduits connecting adjacent containers in the series of containers, so that as hydrogen flows through the conduits from one container to the next, it is cooled. The cooled hydrogen flowing into the subsequent container acts as a convective heat transfer agent in cooling the metal hydrides contained therein. The pressure differential across the series of containers is advantageously reversed periodically by means for periodically reversing or alternating the flow of hydrogen as to the first and the last container in the series thereof. As a result of the periodic reversal of the hydrogen feed to the first and last containers in the series, hydrogen flows back and forth between adjacent containers through the conduits and is cooled each time it passes through the conduits and their associated heat exchangers.

When discharging hydrogen from the series of containers, a pressure differential is established across the series by releasing or discharging hydrogen from either the first or last container in the series to a lower pressure than the pressure in the series of containers. During discharge of hydrogen from the series of containers, the heat exchangers provided in conjunction with the conduits connecting adjacent containers are used to heat the hydrogen flowing through the conduits. The heated hydrogen flowing into the subsequent container acts as convective heat transfer agent in heating the metal hydrides contained therein to provide the endothermic heat required for the release of absorbed hydrogen from the hydride. The pressure differential across the series of containers is advantageously reversed periodically by means for periodically reversing or alternating the discharge of hydrogen from the first and last container in the series thereof. As a result of periodically reversing the discharge of hydrogen from the first and last containers in the series, hydrogen flows back and forth between adjacent containers through the conduits and is heated each time it passes through the conduits and their associated heat exchangers.

Heating of the hydride during the discharge cycle is somewhat more effective than cooling of the hydride in the charging cycle, primarily because greater temperature differentials can be achieved in the heat exchangers when heat is being transferred to the hydrogen flowing therethrough. However, due to practical limitations with respect to the temperature of the heat exchanger medium, it is generally necessary to provide supplemental means for assisting in both heating and cooling the hydride in the containers. Such supplemental cooling can be provided by contacting the outside of the containers with a heat transfer medium. However, it has been found advantageous to utilize a relatively small recirculation of hydrogen, wherein the recirculating stream is cooled or heated as the case may be prior to its being reintroduced into the flow of hydrogen through the containers. The compressor or fan required for circulating the relatively small stream of recirculating hydrogen through the series of containers in accordance with this invention is of minimal size in comparison to compressors required in prior art processes where heating and cooling is done exclusively with a much larger recirculating stream of hydrogen.

THE DRAWINGS

Particular embodiments of the present invention representing the best mode presently contemplated of carrying out the invention are illustrated in the accompanying drawings, in which:

FIG. 1 is a schematic vertical elevation of a system and apparatus wherein centralized heat exchangers are used; and FIG. 3 is a schematic elevation of a modified system similar to that of FIG. 1.

DETAILED DESCRIPTION OF THE ILLUSTRATED EMBODIMENTS

Figure 1:
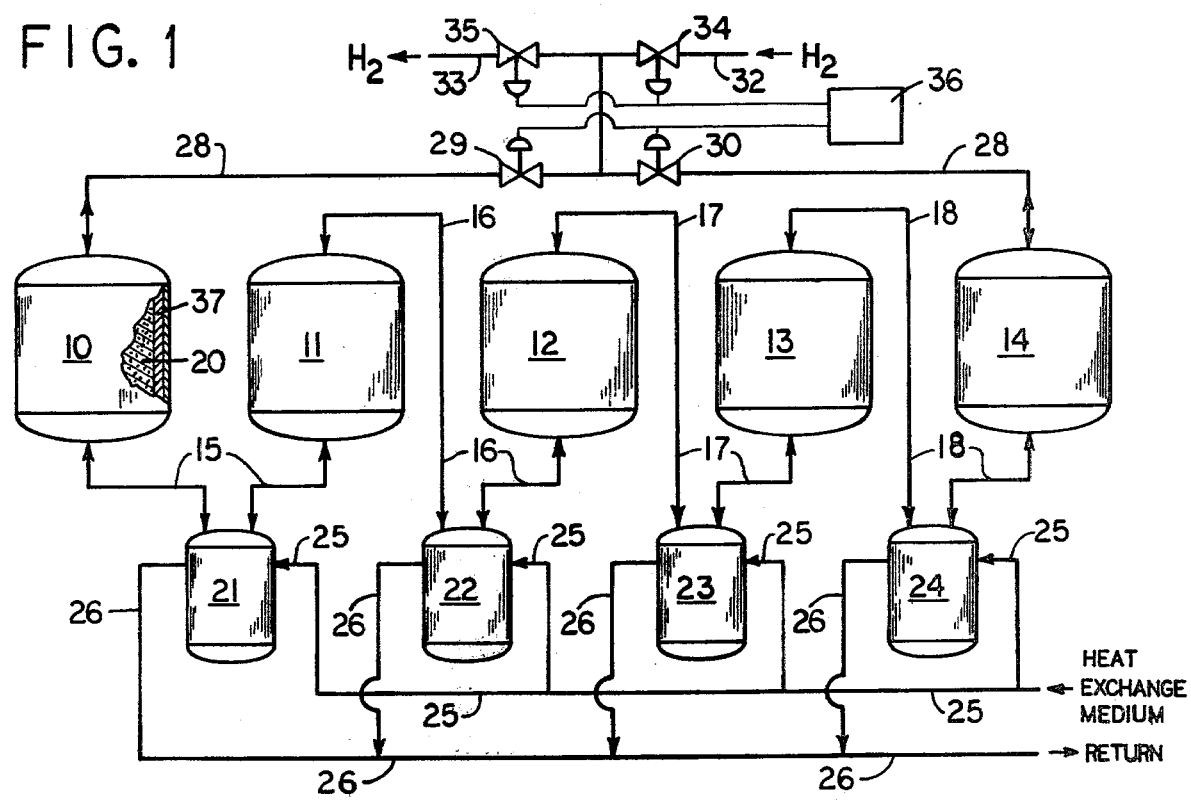

As illustrated in FIG. 1, five containers 10, 11, 12, 13 and 14, are connected in series flow by conduits 15, 16, 17, and 18, respectively, so that when a pressure differential is established across the series of containers, fluid contained in the containers will flow from one container to the adjacent container in the direction of the lower pressure. For example, by charging relatively high pressure hydrogen to container 10, hydrogen would flow to container 11 through conduit 15, to container 12 through conduit 16 and so on, to container 14. Conversely, when hydrogen is released or discharged from container 10, hydrogen would flow from container 11 to container 10 through conduit 15, from container 12 to container 11 through conduit 16, etc. The mutually respective conduits connected to each container are preferably positioned at mutually opposite ends or sides of the containers, respectively, to avoid fluid bypassing portions of the material in the containers as it flows through the series of containers.

Each of the containers 10, 11, 12, 13, and 14 contains a bed of a particulate metal hydride material 20 (see the broken out section of container 10 in FIG. 1). The bed of material 20 need be only sufficiently porous so that it can be permeated by hydrogen at the pressure at which the hydrogen is to be charged to the container. The metal hydride is a metal or metal alloy which is capable of reacting with and thereby absorbing hydrogen gas at a given temperature and pressure. Preferably, the metal hydride is an alloy comprising at least two elements selected from the group consisting of iron, titanium, nickel, calcium, magnesium, manganese, and rare earth elements. Particularly advantageous alloys include iron-titanium alloys, lanthanum-nickel alloys, calcium-nickel alloys, mischmetal-nickel alloys, manganese-nickel alloys, and mischmetal-calcium-nickel alloys. As illustrated in FIG. 1, five containers are connected in series; however, the system is operable with two or more containers. The actual number of containers used will likely depend upon the temperature differential employed in the heat exchangers. For large differentials where a large amount of heat can be exchanged in a single exchanger, the two-container system may suffice. With restricted temperature differentials, using more containers is advantageous so as to provide additional heat exchange capability.

Referring again to FIG. 1, heat exchangers 21, 22, 23, and 24 are associated with conduits 15, 16, 17, and 18, respectively. Each heat exchanger is designed to heat or cool the hydrogen which flows through the conduit with which it is associated. As shown, the heat exchangers are conventional shell and tube exchangers, with hydrogen making a double pass through the exchanger on the tube side. A heat exchange medium passes through the shell side of the exchangers. The heat exchange medium is introduced to the exchangers from a feed manifold 25 and is returned through return manifold 26. The heat exchange medium can be a liquid, vapor, or gas. During cooling cycles, cold liquids are used as the heat exchange mediums. To increase the temperature differential during the cooling cycles, liquified gases such as liquid ammonia can be used as the heat exchange medium. During heating cycles, hot liquids, super heated vapors, and combustion gases are used as the heat exchange mediums. When combustion gases are used, the exhaust gases from the heat exchangers are released to the atmosphere rather than being returned for recycling. Of course, the waste heat could be recovered from the exhaust gases prior to their release to the atmosphere if such is economically feasible.

A hydrogen manifold 28 is provided as means for introducing hydrogen gas to and for withdrawing hydrogen gas from the first and last containers in the series. A pair of valves 29 and 30 are positioned in the manifold 28, and a conduit 31 is connected in flow communication with the manifold 28 at a point between the valves 29 and 30. A hydrogen supply conduit 32 and a hydrogen withdrawal or discharge conduit 33 are connected in flow communication with the conduit 31. Two valves 34 and 35 are coupled into the conduits 32 and 33, respectively.

Means are provided for opening and closing the valves 29, 30, 31, and 32 in accordance with a preset pattern of operation, as will be discussed more fully hereinbelow. Briefly, control means 36 is programmed to automatically open valves 29, one at a time in periodically alternating sequence, when either of the valves 33 and 35 is opened, i.e., whenever hydrogen is being charged to or withdrawn from the series of containers.

In operation, a pressure differential is created across the series of containers. When the containers are being filled, the pressure differential is created by charging the feed hydrogen to either the first container 10 or last container 14 in the series at a pressure substantially greater than the pressure in the other containers in the series. Assuming for purposes of illustration, that hydrogen is being charged to container 10, i.e. valves 34 and 29 are open and valves 35 and 30 are closed. Hydrogen flows through container 10, with a portion of the hydrogen reacting with and being absorbed by the metal hydride contained therein. Overflow hydrogen flows from container 10 to container 11, through conduit 15 and heat exchanger 21 wherein it is cooled prior to its entry into container 11. Hydrogen flows through container 11, with a portion of the hydrogen reacting with and being absorbed by the metal hydride contained therein. The overflow hydrogen from container 11 to container 12, through conduit 16 and heat exchanger 22 wherein it is cooled prior to its entry into container 12. In similar fashion, hydrogen flows from container 12 to container 13 through conduit 17 and heat exchanger 23, and from container 13 to container 14 through conduit 18 and heat exchanger 24. The hydrogen flowing into container 14 reacts with and is absorbed by the metal hydride contained therein, but in its route, it has passed through four heat exchangers and five containers filled with metal hydride.

Periodically, the pressure differential across the series of containers is reversed by alternating the feed of hydrogen to the first and last containers. The control means 36 is programmed to periodically alternate the opening and closing of valves 29 and 30 during the charging or discharging of hydrogen from the series of containers. When hydrogen is not being charged to or withdrawn from the series of containers, i.e., both valves 34 and 35 are closed, the control means 36 is inactivated and the valves 29 and 30 remain indefinitely in either their open or closed position until control means 36 is again activated by opening of one of valves 34 and 35. Valves 29 and 30 are never allowed to open simultaneously during the period when the control means 36 is in operation, i.e., when one of valves 34 and 35 is open.

Thus, during the filling of the containers and following a period in which hydrogen has been charged to the first container, control means 36 closes valve 29 and opens valve 30, so that hydrogen is charged to the last container 14 in the series. Hydrogen then flows from container 14 in series through containers 13, 12, 11, and 10. The flow of hydrogen is similar to that described above for charging hydrogen to the first container 10, except the flow is in the reverse direction. The hydrogen overflow from each container diminishes in the direction of the hydrogen flow. By periodically alternating the flow to the first and last containers of hydrogen, a back and forth movement of hydrogen is obtained. As the hydrogen flows from one container to the next, it is cooled and used as a convective energy carrier in cooling the hydride in the adjacent container.

Figure 3:
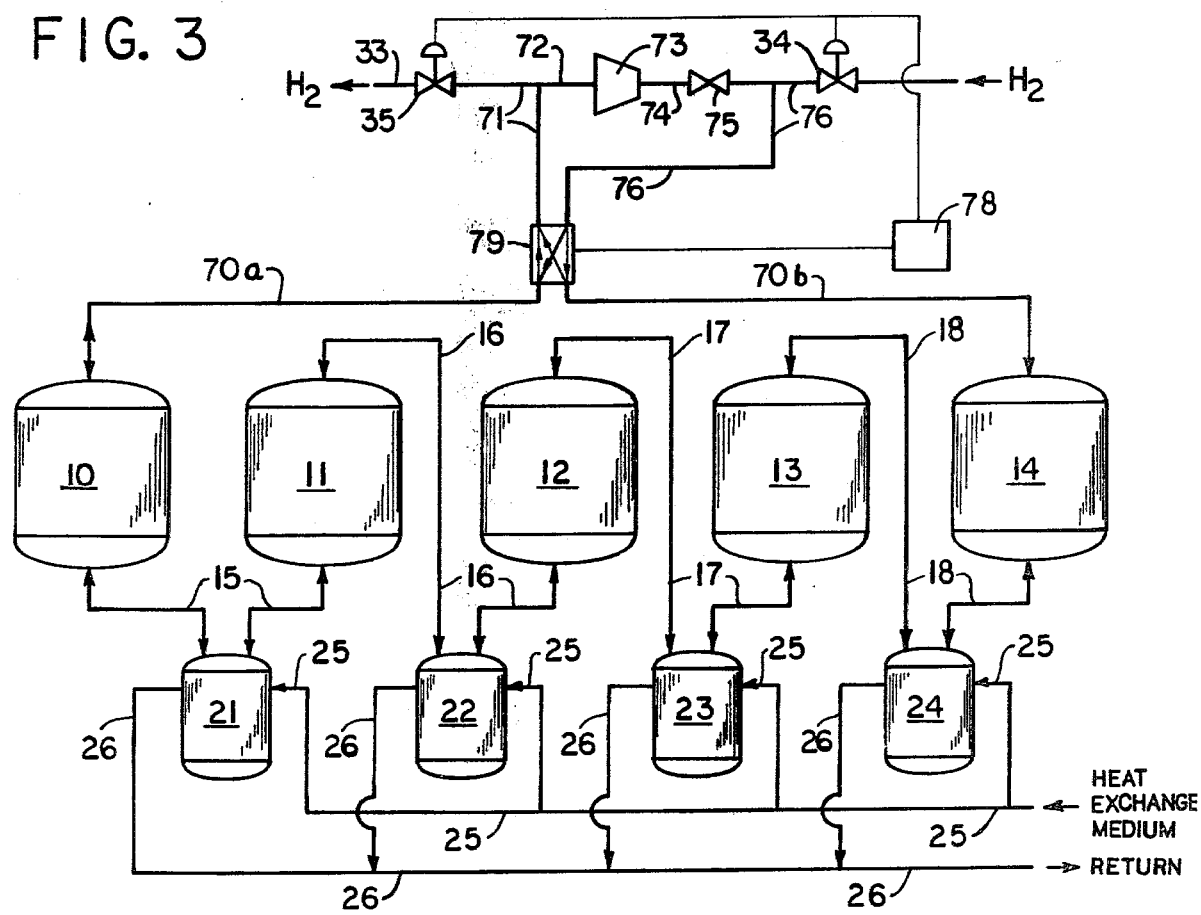

As was mentioned earlier, due to practical limitations on the temperatures of the heat exchange medium available for use in the heat exchangers, it is generally necessary to provide supplemental heating and cooling of the containers during the period in which hydrogen is being charged to the containers. The supplemental heating and cooling can be achieved by heating or cooling the outside of the containers or by circulating a cooling medium through heat exchange means situated within the containers. Advantageously, the cooling can be achieved very efficiently in accordance with the invention, by recirculating a small amount of hydrogen from the container at the downstream end of the series of containers to the containers at the upstream end. A system adapted for such recirculation is shown in FIG. 3, wherein a series of containers and heat exchangers are shown arranged in identical manner to the containers and heat exchangers in FIG. 1. Like apparatus in FIGS. 1 and 3 are identified with the same numeral. The piping between the containers and exchangers are identical in FIGS. 1, and 3, as is the piping for supplying heat exchange medium to the heat exchangers. The hydrogen manifold system for supplying and withdrawing hydrogen to the series of containers is in two parts. Conduit 70a extends from container 10 to a four-way valve 79, while conduit 70b extends from container 14 to the four-way valve 79. Conduit 71 connects the four-way valve with valve 35 in hydrogen discharge conduit 33. A recirculation conduit 72 is connected to the conduit 71 and feeds recirculating hydrogen to pump or compressor 73. Hydrogen from compressor 73 flows through conduit 74 and check valve 75 into conduit 76 and is mixed with hydrogen from the supply conduit 32 when the containers are being charged with hydrogen. The recirculated hydrogen and the hydrogen from supply conduit 32 are fed to the four-way valve 79 through conduit 76. The four-way valve 79, as well as valves 34 and 35 are controlled by controller 78. Controller 78 periodically changes the operation of four-way valve 79 so that during one cycle, the incoming hydrogen from conduit 76 is directed to container 10 through conduit 70a, and recirculating hydrogen is withdrawn from container 14 through conduit 70b and directed to the recirculation compressor 73 through conduits 71 and 72. During the other cycle in the periodic operation of four-way valve 79, hydrogen flows from conduit 76 to container 14 through conduit 70b, and recirculating hydrogen is withdrawn from container 10 through conduit 70a and directed to compressor 73 through conduits 71 and 72. Of course, during the charging of hydrogen to the series of containers, valve 34 is maintained open and valve 35 is maintained closed by controller 78.

As an example of the amount of hydrogen recirculation necessary to provide adequate supplemental cooling during the charging of hydrogen to the containers, a series of containers containing iron titanium hydride was evaluated. When charging hydrogen to iron titanium hydride, about 6,300 BTU is generated per pound of hydrogen which reacts with and is abosorbed by the hydride. When a series of five containers is used as shown in FIG. 3, and a cooling medium is available such that the hydrogen introduced into the first container and that flowing through the heat exchangers between containers can be cooled to a temperature of 50° F., sufficient supplemental cooling can be obtained by recycling about 1.86 pounds of hydrogen from the container at the downstream end of the series to the container at the upstream end per pound hydrogen absorbed in the series of containers. Using a basis of five pounds of hydrogen introduced for reaction and absorption in the series of containers, the five pounds of hydrogen is cooled to 50° F. prior to being introduced into the first container. About 9.3 pounds of recycled hydrogen from the last container in the series is cooled to 50° F. in a heat exchanger associated with conduit 72 but not shown in FIG. 3. The recycled hydrogen is introduced to the first container in the series along with the five pounds of hydrogen feed. For purpose of this example, assume that the hydrogen is fed to container 10. The heat capacity of hydrogen is approximately 3.5 BTU per pound per degree Fahrenheit. Thus, for steady-state operation of container 10 at a temperature of about 200° F., about 1.13 pounds of hydrogen will react with and be absorbed by the metal reactant in the container. About 13.1 pounds of hydrogen flow from container 10 through conduit 15 and heat exchanger 21 to the next container 11. This hydrogen is cooled to about 50° F. and will provide about 6,881 BTU of cooling to the hydride in container 11 for steady-state operation of container 11 at about 200° F. About 1.1 pounds of hydrogen is absorbed in container 11. About 12 pounds of hydrogen flow from container 11 through heat exchanger 22, wherin it is cooled to about 50° F., to container 12. For steady-state operation of container 12 at about 200° F., about one pound of hydrogen is absorbed therein. About 11 pounds of hydrogen flow from container 12 through heat exchanger 23, wherein it is cooled to about 50° F., to container 13. For steady-state operation of container 13 at about 200° F., about 0.9 pounds of hydrogen is absorbed therein. About 10.1 pounds of hydrogen flow from container 13 through heat exchanger 24, wherein it is cooled to about 50° F., to container 14. For steady-state operation of container 14 at about 200° F., about 0.8 pounds of hydrogen is absorbed therein. That leaves about 9.3 pounds of hydrogen to be recirculated to the first container 10 through the recirculation compressor 73 and associated conduits as shown in FIG. 3. As a comparison, if the metal hydride in the series of containers was contained in a single container instead of a series of containers, for every pound of hydrogen absorbed, 11 pounds of recirculating hydrogen would be required. Thus, it can be seen that the present invention provides a way of greatly reducing the load on a recirculating compressor during the charging of hydrogen to storage containers containing metal hydrides.

The hydrogen could be introduced into container 10 throughout the process, without alternating the feed between the first and the last containers in the series. As can be seen from the above discussion, hydrogen is absorbed by the lead containers at a greater rate than by the following containers (container 11 absorbs 1.13 pounds hydrogen while the remaining containers absorb 1.1, 0.9, and 0.8 in that order, respectively). However, as the lead containers become filled to capacity, the following containers will then fill more rapidly. In accordance with a preferred embodiment of the invention, the hydrogen feed is alternated between the first and last container in the series, and the rate of absorption of hydrogen is essentially uniform across the series of containers.

In discharging the hydrogen from the series of containers shown in FIGS. 1 and 3, a pressure differential is created by withdrawing, e.g., discharging, hydrogen from either the first container 10 or last container 14 in the series. Assuming for purposes of illustration, that hydrogen is being withdrawn from container 10, i.e., valves 35 and 29 are open and valves 34 and 30 are closed. Hydrogren flows from container to container in the series in the direction of container 10. As the hydrogen flows from one container to the next, it is heated in the heat exchangers 21, 22, 23, and 24. As in the charging of hydrogen to the containers in FIG. 1, valves 29 and 30 are periodically alternated between their closed and open positions so that the withdrawal of hydrogen is periodically alternated between the first container 10 and the last container 14. In the apparatus shown in FIG. 3, the four-way valve 58 is operated so that hydrogen is periodically withdrawn from the first container and then the last container.

Again, due to practical limitations on the temperatures of the heat exchange medium used in the heat exchangers, it is generally necessary to provide supplemental heating during the period in which hydrogen is being withdrawn from the containers. As hydrogen is released from the metal hydride, for example, iron titanium hydride, about 6,300 BTU is absorbed by the hydride for each pound of hydrogen liberated. When a series of five containers is used as shown in FIG. 3 and a heating medium is available such that hydrogen flowing through the heat exchangers between containers can be heated to a temperature of about 570° F., sufficient supplemental heating can be obtained by recycling about 0.4 pounds of hydrogen from the container at the downstream end of the series to the container at the upstream end per pound of hydrogen released from the metal hydride in the containers. Using a basis of two pounds of hydrogen recycled to the upstream container (container 14 of FIG. 3, wherein hydrogen is being discharged from container 10), the recycled hydrogen is heated to about 570° F. and introduced into container 14, wherein the metal hydride absorbs heat and liberates about 0.6 pounds of hydrogen when operating at a steady-state temperature of about 70° F. About 2.6 pounds of hydrogen flow from container 14 through heat exchanger 24, wherein it is heated to about 570° F., to container 13, wherein the metal hydride absorbs heat and liberates about 0.7 pounds of hydrogen when operating at a steady-state temperature of about 70° F. About 3.3 pounds of hydrogen flow from container 13 to container 12 through heat exchanger 23, wherein it is heated to about 570° F. The metal hydride in container 12 absorbs heat and liberates about 0.9 pounds of hydrogen while operating at about 70° F. About 4.2 pounds of hydrogen flow from container 12 to container 11 through heat exchanger 22, wherein it is heated to about 570° F. The metal hydride in container 11 absorbs heat and releases about 1.2 pounds of hydrogen while operating at about 70° F. About 5.5 pounds of hydrogen flow from container 11 to container 10 through heat exchanger 21, wherein it is heated to about 570° F. The metal hydride in container 10 absorbs heat and releases about 1.5 pounds of hydrogen while operating at about 70° F. About seven pounds of hydrogen flows from container 10, of which two pounds are recycled through recirculation compressor 73 and associated conduits to container 14. The remaining five pounds are fed to the discharge conduit 33 and forwarded to its point of ultimate use. As a comparison, if the metal hydride in the series of containers was contained in a single container instead of a series of containers, for every pound of hydrogen released, 3.6 pounds of recirculating hydrogen would be required. This is more than about nine times the amount of recirculating hydrogen required in accordance with this invention as illustrated in FIG. 3. Thus, it can be seen that the present invention provides a way of greatly reducing the load on a recirculating compressor during the discharge of hydrogen from storage containers containing metal hydrides.

The withdrawal of hydrogen could be made continuously from either of the end containers in the series, with the container from which hydrogen is withdrawn first being depleted followed in turn by the containers upstream thereof. However, in accordance with the preferred embodiment of the invention, withdrawal of hydrogen is periodically alternated between the first and the last containers in the series, whereby the rate of release of hydrogen is substantially uniform across the series of containers.

The supplemental cooling and heating of the containers could be achieved by other means than recirculation of hydrogen as described above. For example, the containers could be provided with jackets so that supplemental heating and cooling mediums could be circulated within the jackets, thereby cooling or heating the containers, or heat exchange apparatus, such as finned tubes or electrical resistance elements, could be positioned within the containers to provide supplemental heating or cooling as required.

Figure 2:
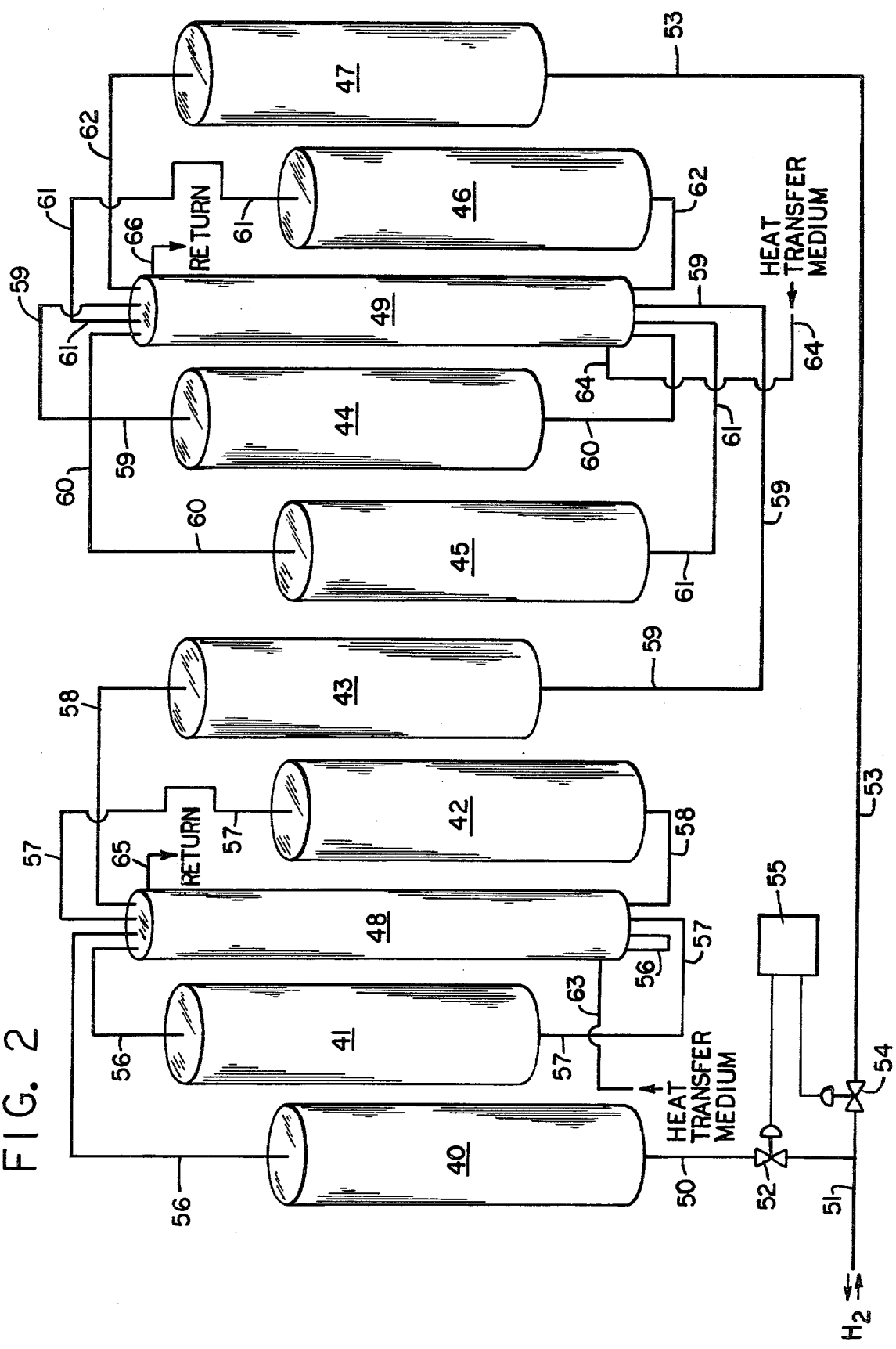

An alternate arrangement of the apparatus of this invention is shown schematically in FIG. 2, wherein centralized heat exchangers are used for each group of four containers. As illustrated two groups of four containers each are provided. All eight containers 40-47 are connected in series so that when a pressure differential is applied across the series of containers, fluid will flow from one container to the next in the series in the direction of lower pressure. The four containers 40, 41, 42, and 43 are arranged around a common heat exchanger 48, with the other containers 44, 45, 46, and 47 being arranged around heat exchanger 49. Flow conduit 50 connects container 40, the first container in the series of eight containers with hydrogen header 51. A valve 52 is positioned in conduit 50. Flow conduit 53 connects container 47, the last container in the series of eight containers with hydrogen header 51, and a valve 54 is positioned in conduit 53. The hydrogen header 51 is adapted to either deliver hydrogen to or withdraw hydrogen from conduits 50 and 53. A controller 55 is connected to valves 52 and 53. The controller 55 maintains one of the valves 52 and 53 open while the other is closed and periodically alternates the valves in their open and closed positions. Conduit 56 is connected to container 40 at one of its ends, passes through heat exchanger 48 (shown making a double pass through the heat exchanger 48 for purposes of simplifying the drawing; however, a single pass or multiple passes of that conduit as well as the other conduits passing through the heat exchangers 48 and 49 is contemplated by the invention), and is connected at its other end to container 41. Container 41 is connected to container 42 by conduit 57, and container 42 is subsequently connected to container 43 by conduit 58. both conduits 57 and 58 pass through heat exchanger 48.

Conduit 59 is connected at one of its ends to container 43, passes through heat exchanger 49, and is connected at its other end to container 44. Container 44 is connected to container 45 by conduit 60. Container 45 is subsequently connected to container 46 by conduit 61, and container 46 is, in turn, connected to container 47 by conduit 62. Conduits 60, 61 and 63 all pass through heat exchanger 49. Heat transfer medium is introduced into heat exchangers 48 and 49 through conduits 63 and 64, respectively. The heat exchange medium passes through the heat exchangers in contact with the portion of the conduits contained within the heat exchangers. Depleted heat exchange medium is either returned for reuse or discarded through conduits 65 and 66, respectively.

The operation of the apparatus shown in FIG. 2 is identical to that of FIG. 1 as described hereinbefore. In charging the series of containers, the feed of hydrogen is periodically alternated between containers 40 and 47 by controller 55. The heat exchangers 48 and 49 are operated so as to cool the hydrogen flowing in the conduits passing therethrough. In withdrawing hydrogen from the series of containers, the discharge of hydrogen is periodically alternated between containers 40 and 47 by controller 55. The heat exchangers 48 and 49 are operated so as to heat the hydrogen flowing in the conduits passing therethrough.

When any supplemental heat requirements are achieved using a hydrogen recirculation as discussed hereinbefore, it has been found advantageous to apply an appropriate layer of insulation 37 (FIG. 1) to the inside of the containers. This minimizes heating or cooling of the container shell. Of course, if supplemetal heat is to be conducted through the container shells, such as by applying heat transfer medium on the outside of the containers, then there should be no layer of insulation on the inside of the containers.

Whereas, this invention is described with respect to particular embodiments, it is to be understood that changes may be made therein and other embodiments constructed without departing from the novel inventive concepts set forth herein and in the claims which follow.

I claim:

1. A method for transferring heat to and from metal hydrides contained in storage containers as hydrogen gas is being charged to or withdrawn from the storage containers, wherein the hydrogen gas which is being charged to or withdrawn from the storage containers functions as a convective energy carrier, said metal hydrides being capable of reacting with and thereby absorbing hydrogen at a given temperature and pressure and thereafter releasing the absorbed hydrogen when the pressure on the metal hydride is reduced or the temperature of the hydride is increased, said method comprising:
   (a) connecting a plurality of storage containers containing the metal hydride together in series flow communications, so that when a pressure differential is established across the series of containers, hydrogen will flow from one container to the next container in the direction of the lower pressure;
   (b) creating a pressure differential across the series of containers by withdrawing hydrogen from either the first or last container in the series so as to reduce the pressure in that container, or by charging hydrogen to either the first or last container in the series so as to increase the pressure in that container; and
   (c) passing the hydrogen gas as it flows between adjacent containers in the series of containers due to the pressure differential established across the series of containers through a heat exchanger means so as to cool the gas when hydrogen is being charged to the series of containers and to heat the gas when hydrogen is being withdrawn from the series of containers.

2. A method in accordance with claim 1, wherein the pressure differential in step (b) is periodically reversed by either (i) periodically alternating withdrawing of hydrogen from the first and last containers of the series, or (ii) periodically alternating charging of hydrogen to the first and last containers of the series.

3. A method in accordance with claim 1, wherein at least two storage containers are connected in series.

4. A method in accordance with claim 1, wherein the metallic hydride is an alloy comprising at least two elements selected from the group consisting of iron, titanium, nickel, calcium, magnesium, manganese, and rare earth elements.

5. A method in accordance with claim 3, wherein the metallic hydride comprises an alloy selected from the group consisting of iron-titanium alloys, lanthanum-nickel alloys, calcium-nickel alloys, mischmetal-nickel alloys, manganese-nickel alloys, and mischmetal-calcium-nickel alloys.

6. A method in accordance with claim 1, wherein a recirculating stream of hydrogen is withdrawn from the container having the lowest pressure; the recirculating stream is cooled when hydrogen gas is being charged to the series of containers and heated when hydrogen gas is being withdrawn from the series of containers, and, subsequently, the recirculating stream is reintroduced into the container having the highest pressure.

7. A system for transferring heat to and from metal hydrides contained in storage containers, comprising:
  a plurality of storage containers;
  a hydride-forming, metallic reactant disposed in each of the storage containers;
  fluid conveying conduits connecting the containers in series flow with each other so that when a differential pressure is established across the series of containers, fluid will flow from one container to the next container in the direction of the lower pressure;
  means of introducing hydrogen gas to and of withdrawing hydrogen gas from the first and last containers in the series; and
  means of heating or cooling the hydrogen gas which flows between the containers through the conduits which connect the containers in series flow with each other.

8. A system in accordance with claim 7, further including:
  means of periodically alternating the flow of hydrogen gas to the first and last containers in the series, and thereby periodically reversing the pressure differential across the series of containers when the containers are being charged with hydrogen gas; and
  means of periodically reversing the flow of hydrogen gas from the first and last containers in the series, and thereby periodically reversing the pressure differential across the series of containers when hydrogen gas is being withdrawn from the series of containers.

9. A system in accordance with claim 8, wherein the means for periodically reversing the flow of hydrogen to the first and last containers in the series thereof during the charging of hydrogen to the containers, and for periodically reversing the flow of hydrogen from the first and last containers in the series thereof when hydrogen is being withdrawn from the series of containers, comprises a manifold which is in flow communication through first valve means to the first tank in said series, and through a second valve means to the last container in said series, said manifold being adapted for connection to a supply of hydrogen gas under pressure, or to a discharge line in which hydrogen can be withdrawn from the series of containers at a pressure less than the pressure in said series of containers, and means are provided for controlling said first and second valve means so that one of the valves will be open when the other valve is closed, and of periodically alternating the valve which is open.

10. A system in accordance with claim 7 wherein, there are at least about five containers connected together in said series of containers.

11. A system in accordance with claim 7, wherein, the means for heating and cooling the flow of hydrogen in the conduits between the containers comprises heat exchanger adapted to contact the conduits with a heat exchange medium.

12. A system in accordance with claim 7, wherein the means for heating and cooling the flow of hydrogen gas in the conduits between the containers comprises a central heat exchanger through which all the conduits pass, said central heat exchanger being adapted to contact the conduits with a heat exchanging medium.

13. A system in accordance with claim 7, further including means for recirculating a stream of hydrogen gas from the container having the lowest pressure to the container having the highest pressure.

* * * * *